May 29, 1956     E. C. HARTWIG ET AL     2,748,343
ELECTRONIC SEAM WELDER
Filed Sept. 4, 1953     2 Sheets-Sheet 1

WITNESSES:

INVENTORS
Edward C. Hartwig and
Hubert W. Van Ness.
BY
ATTORNEY

United States Patent Office 2,748,343
Patented May 29, 1956

2,748,343

ELECTRONIC SEAM WELDER

Edward C. Hartwig, Walnut Creek, Calif., and Hubert W. Van Ness, East Aurora, N. Y., assignors to Westinghouse Electric Corporation, East Pittsburgh, Pa., a corporation of Pennsylvania Application September 4, 1953, Serial No. 378,444

11 Claims. (Cl. 323—36)

Our invention relates to electric discharge apparatus, and has particular relation to sequence timers for timing the intervals of an industrial process. Our invention is typified by sequence timers for electric resistance welders.

This application relates to an application Serial No. 378,546, filed September 4, 1953, to Edward C. Hartwig and assigned to Westinghouse Electric Corporation, which will be called hereinafter the Hartwig application, and to another application Serial No. 378,446, filed by us on September 4, 1953, and assigned to Westinghouse Electric Corporation, which will be called hereinafter the Hartwig-Van Ness application. The present application is a continuation-in-part of the Hartwig-Van Ness application.

In the Hartwig application, a sequence timer of simple structure for general purposes is disclosed; in the Hartwig-Van Ness application, a sequence timer for a pulsation or interrupted spot welder is disclosed. The timers disclosed in the Hartwig and the Hartwig-Van Ness applications are conceived to time a process which while made up of components which are repetitive has a definite duration. In addition to timers of this type, timers which time an indefinitely repetitive process are frequently necessary. An example of a process requiring such a timer is a seam welding process in which a seam is produced by electric resistance welding. Such a weld is usually characterized by a plurality of welded spots which are produced individually but overlap. A seam weld may also be produced by transmitting current sufficient for welding continuously through the material as it is moved. Seam welds are used in industry in situations in which a gas or liquid tight joint is desired as, for example, in the gasoline tank of an automobile.

It is an object of our invention to provide a sequence timer of the general class disclosed in the Hartwig application for timing an indefinitely repeated process such as a seam welding process.

Another object of our invention is to provide a sequence timer of simple structure having a low cost of manufacture and a low maintenance cost, which shall be particularly suitable for timing an indefinitely repeated process such as a seam welding process.

An incidental object of our invention is to provide novel electronic circuits particularly suitable for a seam welder sequence timer, or for sequence timers for similar industrial purposes.

In accordance with our invention we provide a sequence timer which includes three principal components, two electric discharge devices such as thyratrons and rectifier means which may consist of a single dry rectifier, but preferably includes several dry rectifiers. The thyratrons and the rectifiers will be referred to herein by the generic term valves. In the apparatus disclosed in our present application, as in the apparatus disclosed in the Hartwig application and in the Hartwig-Van Ness application, the valves which produce successive timing periods are connected to opposite phase supply conductors through inductive reactance means so that each valve manifests the carry-over effect, that is, remains conductive after the potential of the supply from which the valve derives its anode-cathode potential becomes negative. In the apparatus disclosed in this application as in the others, a leading valve is connected to the control circuit of a following valve so that the following valve is rendered conductive in synchronism with the supply. But our present invention differs in the important respect from the others that the principal combination of a leading and following valve which it includes consists of simple rectifier means such as one or more low cost dry rectifiers in combination with a thyratron. Where the thyratron is of the type, discussed in the Hartwig application, which has a tendency to become inoperative if a high negative potential is impressed between its control electrode and its cathode while it is conductive, the rectifier means consists of an assembly of dry rectifiers, certain of which are connected, as disclosed in the Hartwig application, to reduce the negative potential which is impressed between the control electrode and the cathode of the thyratron while it is conductive. In the event that the thyratron is of the type which does not manifest the above-mentioned phenomenon, the rectifier means may be a single dry rectifier.

A sequence timer in accordance with our invention includes in addition to the rectifier means and the thyratron described above, an additional or auxiliary thyratron so connected to the thyratron mentioned above, which may be called the main thyratron, as to permit the latter to conduct for predetermined time intervals and to prevent it from conducting during intervening intervals. The main thyratron is so connected to a power supply circuit that while it is conducting it causes power to flow to the material to be welded. During the intervals when it is not conducting, the power flow to the material to be welded is interrupted. In this manner a series of individual welds are produced. The timing is such that the welds overlap.

In sequence timers in accordance with our invention provisions are also included for disconnecting the second thyratron from the control circuit of the first. Under such circumstances, the first thyratron once rendered conducting continues to conduct, and power is supplied to the material to be welded continuously. A continuous seam may thus be produced.

The novel features that we consider characteristic of our invention are set forth generally above. Our invention itself, both as to its organization and its method of operation, together with additional objects and advantages thereof, will be understood from the following description of specific embodiments when read in connection with the accompanying drawings, in which.

DESCRIPTION—FIGURE 1

Figure 1:
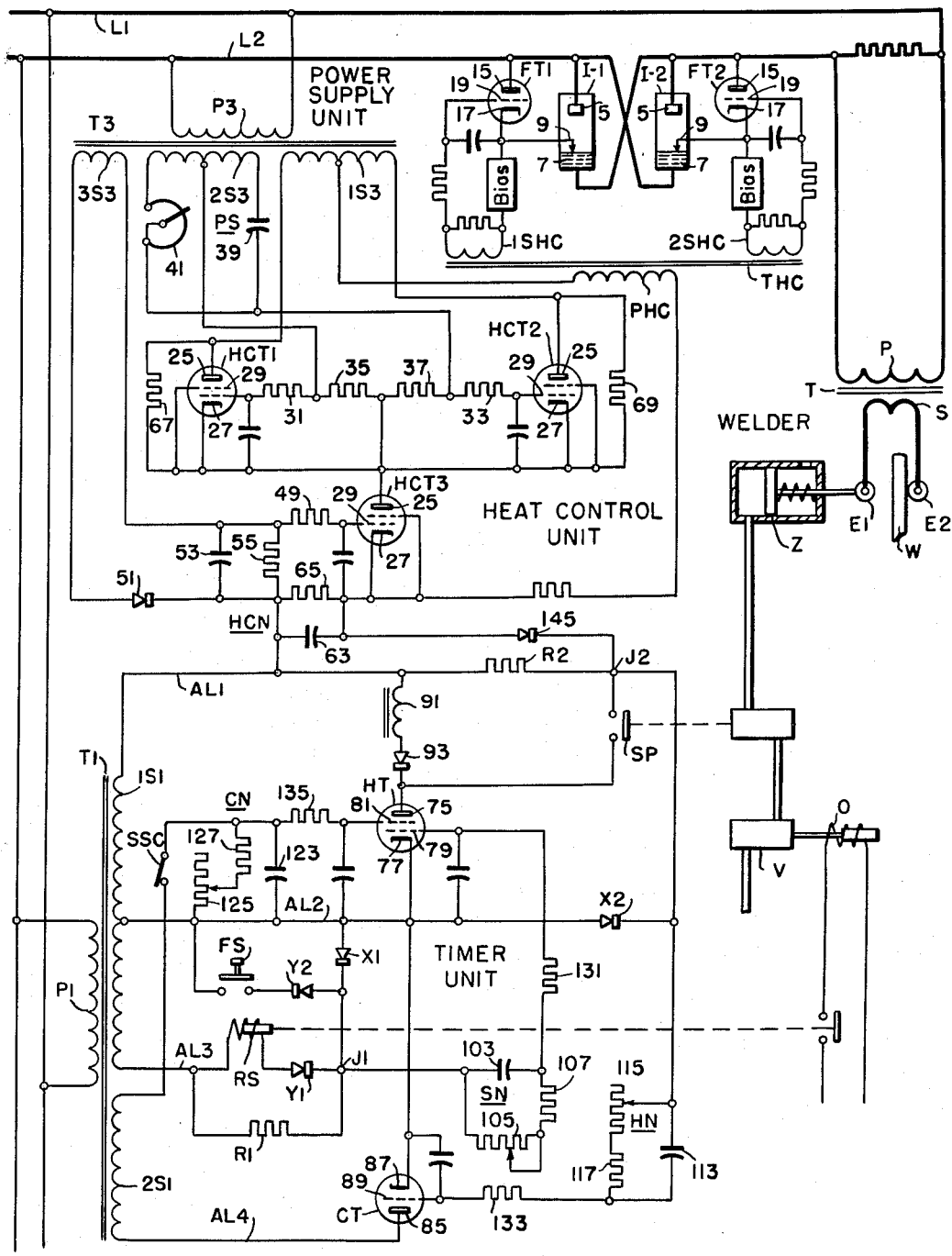
Figure 1 is a circuit diagram showing a preferred embodiment of our invention.

In Fig. 1 our invention is shown as applied to a resistance welding process for producing seam welds. The apparatus disclosed in Fig. 1 includes a welder, a power supply unit, a heat control unit and a timer unit. This apparatus derives its power from a pair of main conductors L1 and L2 which may be energized from the usual commercial alternating current supply available. In addition, there are auxiliary conductors AL1, AL2, AL3 and AL4 which are energized from the main conductors through a transformer T1. This transformer has a pair of secondaries 1S1 and 2S1. Secondary 1S1 has end terminals and an intermediate terminal. Conductors AL1 and AL3 are connected to the end terminals and conductor AL2 to the intermediate terminal. The secondary 2S1 has an end terminal to which conductor AL4 is connected.

The welder includes a welding transformer T having a primary P and a secondary S. Welding electrodes E1 and E2, which are usually rollers in a seam welder, are connected across the secondary S. The electrode E1 is movable relative to the electrode E2 by means of a piston Z which is fluid actuable. The fluid for moving the piston is controlled by a magnetically actuable valve V, and its operation is controlled from the solenoid O. During a welding operation, the work W is inserted between the electrodes E1 and E2, and the welding proceeds after adequate pressure has been applied between the electrodes and the work. To assure that the pressure is adequate, a pressure switch SP actuable by the back pressure on the cylinder Z is connected in the circuit which controls the supply of power to the welder.

The power supply unit includes a pair of ignitrons I-1 and I-2. Each ignitron has an anode 5, a cathode 7 and an ignitor 9. The anodes 5 and cathodes 7 of the ignitrons are connected in anti-parallel between the primary P and the supply conductors L1 and L2. With each ignitron, a firing thyratron FT1 and FT2, respectively, is associated. Each firing thyratron has an anode 15, a cathode 17 and a control electrode 19. The anode 15 of each thyratron FT1 and FT2 is connected to the anode 5 of the associated ignitron I-1 and I-2, respectively. The cathode 17 of each thyratron is connected to the ignitor 9 of the associated ignitron. The control electrode 19 of each thyratron FT1 and FT2 is connected to its cathode 17 through the secondary 1SHC and 2SHC, respectively, of a heat control transformer THC, associated with the heat control unit, and through a bias. The bias is adequate to prevent conduction of the thyratrons FT1 and FT2 in the quiescent condition of the apparatus when the transformer THC is deenergized or when the current flow through the transformer THC is small. When the current flow through transformer THC is substantial, the potential which it supplies to the secondaries 1SHC and 2SHC is adequate to counteract the bias, and the thyratrons FT1, FT2 and ignitrons I-1 and I-2 are rendered conducting during alternate half periods of the supply L1, L2.

The heat control unit includes a plurality of thyratrons HCT1, HCT2 and HCT3. Each of these thyratrons has an anode 25, a cathode 27 and a control electrode 29. Power for the heat control unit is derived from a transformer T3, the primary P3 of which is connected between the conductors L1 and L2, and which has three secondaries 1S3, 2S3, and 3S3. The secondary 1S3 has a pair of end terminals and an intermediate terminal. The end terminals are connected each directly to the anode 25 of one of the thyratrons HCT1 and HCT2, respectively. The intermediate terminal is connected to the cathode 27 of thyratron HCT3 through the primary PHC of transformer THC. The cathodes 27 of thyratrons HCT1 and HCT2 are connected together and their common junction is connected to the anode 25 of thyratron HCT3. The thyratrons HCT1 and HCT2 are thus connected in push-pull and in series with the thyratron HCT3. Each of the control electrodes 29 of the thyratrons HCT1 and HCT2 is connected to its cathode through a grid resistor 31 and 33 and an additional resistor 35 and 37 respectively.

The secondary 2S3 also has end terminals and an intermediate terminal. Between the end terminals a capacitor 39 is connected in series with a variable resistor 41. Between the junction of the capacitor 39 and the resistor 41 and the intermediate terminal of the transformer, a potential having a phase relationship to the potential of the secondary 2S3, which depends on the setting of the variable resistor 41, appears. The circuit including the secondary 2S3, the capacitor 39 and the variable resistor 41 thus constitutes a phase shifter PS. The output terminals of this phase shifter are connected each to a junction of one of the grid resistors 33 or 35 and the other resistors 37 and 39 respectively.

The control electrode 29 of the thyratron HCT3 is connected to its cathode 27 through a grid resistor 49, a bias provided by the secondary 3S3 which is connected through a rectifier 51 across a capacitor 53 and a resistor 55 and through a time constant network HCN including a capacitor 63 and a resistor 65. The capacitor 63 and the resistor 65 are so related that when the capacitor 63 is charged during one half period of the supply and the charging is interrupted, the discharge of the capacitor through the resistor 65 takes place in a time interval somewhat greater than the succeeding half period of the supply.

Resistors 67 and 69 are connected in parallel with the anodes 25 and cathodes 27 of the thyratrons HCT1 and HCT2. These resistors are of such magnitude as to permit conduction through thyratron HCT3 when the latter is rendered conducting and the thyratrons HCT1 and HCT2 are not. But, the magnitudes of these resistors 67 and 69 are so high that when HCT1 and HCT2 are not conducting and HCT3 is, the current flow through the primary PHC is insufficient to fire the thyratrons FT1 and FT2.

The timer unit includes an assembly of rectifiers Y1 and Y2, a first thyratron HT, which may be called the heat-time thyratron, and a second thyratron CT which may be called the cool-time thyratron. The rectifiers Y1 and Y2 may be simple dry rectifiers of the selenium or copper oxide type, or they may be simple diodes such as parts of a 6H6 tube. The thyratrons HC and CT may be, and usually are, of the type WL2050. Rectifiers Y1 and Y2 are connected between conductors AL3 and AL2 through the exciting coil of a starting relay RS and through a starting switch FS, and are poled so as to conduct positive current from the conductor AL3 to the conductor AL2.

The thyratron HT includes an anode 75, a cathode 77, a first control electrode 79 and a second control electrode 81. The thyratron CT includes an anode 85, a cathode 87 and a control electrode 89. The anode 75 of thyratron HT is connected to conductor AL1 through an inductive reactance 91 and a rectifier 93 which may be of the dry type, and which is poled to conduct positive current from the conductor AL1 to the anode. The cathode 77 of thyratron HT is connected directly to conductor AL2. The anode 85 of thyratron CT is directly connected to the conductor AL4; the cathode 87 is connected to conductor AL2.

The timer unit in addition to the above components includes a plurality of time constant networks SN, HN and CN. The network SN may be called the squeeze network; it times the so-called squeeze operation during which the movable electrode E1 is engaged with the work and pressure is applied to the work. The network HN may be called the heat-time network as it times the interval during which welding current is supplied to the material. The network CN may be called the cool-time network because it determines the intervals during which the welding current is interrupted.

Each network SN, HN, CN includes a capacitor 103, 113, 123 shunted by a variable resistor 105, 115, 125 and a fixed resistor 107, 117, 127, respectively. The resistors 105, 107, 115, 117, 125, 127 determine the time interval during which the capacitors 103, 113, 123 respectively discharge after they have been charged and thus the duration of the squeeze, heat time and cool time intervals.

The squeeze network SN is connected between the junction of the rectifiers Y1 and Y2 and the first control electrode 79 of the heat-time thyratron HT through a grid resistor 131. The heat-time network HN is adapted to be connected between the anode 75 of the heat-time thyratron HT and the control electrode 89 of the cool-time thyratron CT through the pressure switch SP and a grid resistor 133. The cool-time network CN is connected at one terminal between the secondary 2S1 and the conductor AL2 through the seam continuous switch SSC. At the other terminal, the cool-network CN is connected to the second control electrode 81 of the thyratron HT through a grid resistor 135.

It is contemplated that the thyratrons HT and CT will usually be of the type that cleans up or becomes inoperative if high negative potentials are impressed on their control electrodes while they are conducting. Provisions are accordingly included to prevent this difficulty.

A rectifier X1 and a resistor R1 are connected between the conductor AL2 and the conductor AL3. The rectifier X1 is poled to conduct positive current from the conductor AL2 to the conductor AL3. The junction J1 of these components is connected to the junction of the rectifiers Y1 and Y2. It is seen that because of the presence of rectifier X1 current could flow through the coil of relay RS independently of the positions of starting switch FS if the rectifier Y1 were not in the circuit between coil RS and rectifier X1 and it is to prevent this condition that rectifier Y1 is included. A rectifier X2 and a resistor R2 are also connected between the conductors AL2 and AL1 intersecting at a junction J2. The rectifier is poled to conduct current from the conductor AL2 to the conductor AL1. The junction J2 is adapted to be connected to the anode 75 of thyratron HT through the pressure switch SP.

The conductor AL1 is connected to one of the terminals of the time constant network HCN in the control circuit of the thyratron HCT3. The junction J2 is connected to the other terminal of the network HCN through a rectifier 145 which may be of the dry type and through the pressure switch SP. The rectifier 145 is poled to conduct current from the network HCN to the anode.

STANDBY—FIGURE 1

The standby condition and operation of the apparatus shown in Figure 1 in welding a seam will now be described with the switch SSC in the closed position.

In the standby condition of the apparatus the circuit breakers or other main switching equipment (not shown) for the apparatus is closed. The cathodes of the thyratrons FT1, FT2, HCT1, HCT2, HCT3, HT, and CT are heated and the bias impressed on thyratrons FT1 and FT2, HCT3 becomes effective. Thyratrons HCT1, HCT2 and HCT3 and FT1 and FT2 and ignitrons I-1 and I-2 are then non-conducting.

Since the starting switch FS is open, current does not flow through the rectifiers Y1 and Y2 and relay RS is deenergized so that its contact in the circuit of solenoid O is open. The valve V is then closed and the electrode E1 is retracted from the electrode E2.

With the switch FS open and rectifier Y2 non-conducting, current flows during the half periods when conductor AL3 is positive with respect to conductor AL2 through the resistor R1 (and through the parallel path including the coil of relay RS and rectifier Y2) and between the first control electrode 79 and the cathode 77 of the heat-time thyratron HT to charge the capacitor 103 in the squeeze network SN. Bias is accordingly applied to the first control electrode 79 of the thyratron HT to maintain the latter non-conducting. Since thyratron HT is non-conducting, the capacitor 63 in the heat control network HCN is uncharged.

During the half periods when the conductor AL1 is positive with respect to conductor AL2, current flows through the resistor R2 between the control electrode 89 and the cathode 87 of the cool-time thyratron CT to charge the capacitor 113 in the heat-time network HN. Blocking bias is accordingly impressed by this network between the control electrode 89 and the cathode 87 of thyratron CT, and thyratron CT is non-conducting. Since thyratron CT is non-conducting the capacitor 123 in the coil network CN is uncharged.

OPERATION—FIGURE 1

When a seam weld is to be produced, the variable resistor 41 in the phase shift circuit PS is set to correspond to the desired heat, the resistor 105 to the desired squeeze time, the resistor 115 to the desired heat time and the resistor 125 to the desired cool time and the material is disposed on electrode E2. The start switch FS is then closed.

Current now flows through the starting relay RS and through the rectifiers Y1 and Y2. The starting relay RS is actuated to close the circuit through the solenoid O and the valve V is opened to apply pressure above the piston Z so that the movable electrode E1 is engaged with the work. In addition, the potential which during the stand-by condition of the apparatus provided the charge on the capacitor 103 of the squeeze network SN is now reduced to the drop across the rectifier Y2. This potential is insufficient to maintain the capacitor 103 charged and the latter discharges. Eventually, the potential of the squeeze network SN thus decays to a very low negative magnitude and the heat time thyratron HT is rendered conducting. Since the circuit including the rectifiers Y1 and Y2 manifests the carry-over effect, the thyratron HT is rendered conducting substantially at the beginning of its positive half period of the supply AL1—AL2.

While the squeeze network SN was timing out, the pressure applied to the work by the electrode E1 was being increased until it reached a magnitude such that the pressure switch SP was closed. When thyratron HT conducts, current flows through the rectifier 145 in series with the anode 75 of the thyratron HT to charge the capacitor 63 in the network HCN. The capacitor is so charged that its plate electrically nearest the control electrode 29 of thyratron HCT3 is positive, and the other plate negative. The potential impressed from secondary 1S3 between the anode 25 and cathode 27 of thyratron HCT3 is positive during each half period of the supply and thus is in phase with the potential impressed between conductors AL1 and AL2 when the latter is positive. Since thyratron HT is rendered conducting at the beginning of its positive half period of anode-cathode potential, capacitor 63 is charged and thyratron HCT3 is also rendered conducting at the beginning of its positive half period of anode-cathode potential.

The network PS is set so as to render thyratrons HCT1 and HCT2 conducting at predetermined instants in their positive half periods of the supply. Initially, during each half period of the supply thyratron HCT3 then conducts through the resistors 67 and 69 in parallel with the thyratrons HCT1 and HCT2 and thyratrons FT1 and FT2 are not rendered conducting. At the instants set by the network PS thyratrons HCT1 and HCT2 conduct short-circuiting the resistors 67 and 69 and current of substantial magnitude is supplied through the primary PHC. The corresponding potential induced in the secondaries 1SHC and 2SHC at the instants when the thyratrons HCT1 and HCT2 become conducting is sufficient to render the firing thyratrons FT1 and FT2 conducting, each in its turn. The ignitrons I-1 and I-2 thus conduct each in its turn, the conduction starting at an instant determined by the setting of the phase shift network PS and current is supplied to weld the work W.

The thyratron HT is rendered conducting during succeeding positive half periods of the potential impressed between the conductors AL1 and AL2. During each half period when the thyratron HT is conducting, the network HCN is adequately charged to maintain the conduction of one of the thyratrons HCT1 or HCT2. The time constant of the network HCN is such that during the succeeding half period when the thyratron HT does not conduct, the thyratron HCT3 is still conducting and permits the thyratrons HCT1 and HCT2 to conduct. Thus, for each half period during which the thyratron HT conducts, the ignitrons I-1 and I-2 conduct during a full period. Since thyratron HT renders thyratron HCT3 conducting at the beginning of a half period, the conduction of thyratrons HCT1 and HCT2 at instants corresponding to the setting of network PS is assured.

Thyratron HT continues to conduct during alternate half periods so long as the cool-time thyratron CT remains non-conducting by the charge in network HN. The capacitor of network HN was originally charged by the anode-cathode potential across the thyratron HT while it was non-conducting. When thyratron HT does conduct, the charge of the network HN is interrupted. This network then discharges and times out. At the end of its timing interval, thyratron CT is rendered conducting. Because thyratron HT manifests the carry-over effect, thyratron CT is rendered conducting at the beginning of its positive half period of anode-cathode potential. Once thyratron CT is rendered conducting, it charges the capacitor of the cool time network CN. Thyratron HT is now rendered non-conducting and the flow of welding current is interrupted.

When thyratron HT becomes non-conducting, the capacitor in network HN is again charged rendering thyratron CT non-conducting. Network CN is then no longer supplied with charging current and its capacitor discharges. At the end of the cool time when the network CN times out, thyratron HT is again rendered conducting and current again flows through the ignitrons I-1 and I-2 to produce a succeeding weld. The above-described process is now again repeated.

The production of welds as above described continues until the complete seam has been produced. During this time the start switch FS remains closed. After the seam has been produced, the start switch is opened. The capacitor 193 in the squeeze network SN then again charges impressing a blocking potential on the heat-time thyratron HT. The latter then remains non-conducting and the welding operation is at an end.

*Continuous current weld*

If it is desired to produce a seam by continuous flow of current through the material, the switch SSC is opened. Under these circumstances, the thyratron HT once rendered conducting, remains conducting throughout the welding interval and current continuously flows to weld the material.

DESCRIPTION—FIGURE 2

Figure 2:
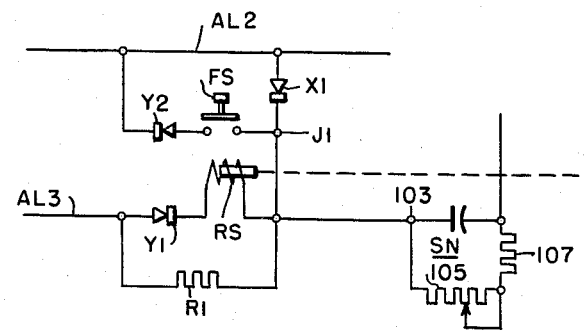
Fig. 2 is a portion of a circuit diagram showing a modification of our invention.

The apparatus shown in Fig. 2 is similar to the apparatus shown in Fig. 1 except that the rectifier Y1 is directly connected to the conductor AL3 and the coil of the relay RS is connected to the start switch FS. The operation of the apparatus shown in Fig. 2 is similar to that shown in Fig. 1.

DESCRIPTION—FIGURE 3

Figure 3:
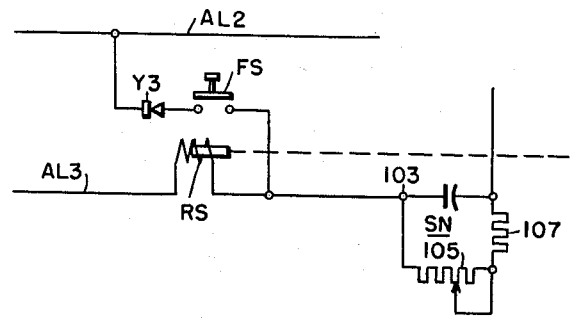
Fig. 3 is a portion of a circuit diagram showing a further modification of our invention.

The apparatus shown in Fig. 3 is conceived for use in a system in which the heat-time thyratron (HT—Fig. 1) and the cool-time thyratron (CT—Fig. 1) are not of the type which become inoperative if a high negative potential is impressed between the control electrode and the cathode while the thyratron is conducting. In this case then, the network X1, R1 of the Fig. 1 apparatus may be omitted and the relay RS connected between the conductors AL3 and AL2 through the starting switch FS and a single rectifier Y3. The operation of the apparatus shown in Fig. 3 is similar to the operation of the apparatus shown in Fig. 1.

*Conclusion*

We have disclosed herein a sequence timer of simple and low cost structure having a low maintenance cost, which timer is particularly suitable for timing an indefinitely repeated process such as a seam weld. This timer is far superior to any of the timers provided in accordance with the teachings of the prior art.

While we have shown and described certain specific embodiments of our invention, many modifications thereof are conceivable. Our invention, therefore, is not to be restricted except insofar as is necessitated by the spirit of the prior art.

We claim as our invention:

1. In combination a first conductor, a second conductor, a third conductor, means for impressing alternating potentials in opposite phase relationship between said first conductor and said second conductor and between said third conductor and said second conductor, first rectifier means, second rectifier means, third rectifier means, impedance means, inductive reactance means, means for connecting said first rectifier means to said second conductor poled so as to conduct positive current to said second conductor, means for connecting said second rectifier means and said reactance means in series between said first rectifier means and said third conductor, said second rectifier means being poled to conduct positive current from said third conductor to said first rectifier means, means for connecting said third rectifier means between said second conductor and said first rectifier means in a sense to conduct positive current from said second conductor to said first rectifier means, means for connecting said impedance means between said third rectifier means and said third conductor, an electric discharge device having an anode, a cathode and a control electrode, a time constant network, means for connecting said anode and cathode between said first and second conductors respectively, and means for connecting said network between the junction of said third rectifier means and said impedance means and said control electrode.

2. The combination according to claim 1 characterized by the fact that the first, second and third rectifier means are of the dry type.

3. In combination a first conductor, a second conductor, a third conductor, first rectifier means, second rectifier means, third rectifier means, impedance means, inductive reactance means, means for connecting said first rectifier means to said second conductor poled so as to conduct positive current to said second conductor, means for connecting said second rectifier means and said reactance means in series between said first rectifier means and said third conductor, said second rectifier means being connected to conduct positive current from said third conductor to said first rectifier means, means for connecting said third rectifier means between said second conductor and said first rectifier means poled to conduct positive current from said second conductor to said first rectifier means, means for connecting said impedance means between said third rectifier means and said third conductor, an electric discharge device having an anode, a cathode and a control electrode, a time constant network, means for connecting said anode and cathode between said first and second conductors respectively, and means for connecting said network between the junction of said third rectifier means and said impedance means and said control electrode.

4. In combination a first conductor, a second conductor, a third conductor, means for impressing alternating potential in opposite phase relationship between said first conductor and said second conductor and between said third conductor and said second conductor, inductive reactance means, rectifier means, means for connecting said inductive reactance means and said rectifier means in series between said third conductor and said second conductor respectively, said rectifier means being poled to conduct positive current from said third conductor to said second conductor, an electric discharge device having an anode, a cathode and control electrode, means for connecting said anode and cathode between said first conductor and said second conductor respectively, a time constant network, and means for connecting said network between the junction of said reactance means and said rectifier means and said control electrode.

5. In combination a first conductor, a second conductor, a third conductor, inductive reactance means, rectifier means, mean for connecting said inductive reactance means and said rectifier means in series between said third conductor and said second conductor respectively, said rectifier means being poled to conduct positive current from said third conductor to said second conductor, an electric discharge device having an anode, a cathode and control electrode, means for connecting said anode and cathode between said first conductor and said second conductor respectively, a time constant network, and means for connecting said network between the junction of said reactance means and said rectifier means and said control electrode.

6. The combination according to claim 5 characterized by the fact that the rectifier means is of the dry type.

7. In combination a first conductor, a second conductor, a third conductor, means for impressing alternating potentials in opposite phase between said first conductor and said second conductor and said third conductor and said second conductor, rectifier means, first inductive reactance means, means for connecting said reactance means and said rectifier means between said third conductor and said second conductor respectively, said rectifier means being poled to conduct positive current from said third conductor to said second conductor, a first electric discharge device having an anode, a cathode, and a control electrode, second inductive reactance means, means, including said second reactance means for connecting said anode and cathode between said first conductor and said second conductor respectively, a first time-constant network, means for connecting said network between the junction of said first reactance means and said rectifier means and said control electrode, a fourth conductor, means for impressing a potential between said fourth conductor and said second conductor in opposite phase to the potential between said first conductor and said second conductor, a second electric discharge device having an anode, a cathode and a control electrode, means for connecting said anode and cathode of said second device between said fourth conductor and said second conductor respectively, a second time constant network, means for connecting said network between said anode of said first device and said control electrode of said second device, and means responsive to the conduction of said second device for rendering said first device non-conducting.

8. In combination a first conductor, a second conductor, a third conductor, means for impressing alternating potentials in opposite phase between said first conductor and said second conductor and said third conductor and said second conductor, rectifier means, first inductive reactance means, means for connecting said reactance means and said rectifier means between said third conductor and said second conductor respectively, said rectifier being poled to conduct positive current from said third conductor to said second conductor, a first electric discharge device having an anode, a cathode, and a control electrode, second inductive reactance means, means, including said second reactance means for connecting said anode and cathode between said first conductor and said second conductor respectively, a first time-constant network, means for connecting said network between the junction of said first reactance means and said rectifier means and said control electrode, a second electric discharge device having an anode, a cathode and a control electrode, means for impressing between said anode and cathode an alternating potential in opposite phase to the potential between said first conductor and said second conductor, a second time-constant network, means for connecting said network between said anode of said first device and said control electrode of said second device, and means responsive to the conduction of said second device for rendering said first device non-conducting.

9. The combination according to claim 8 characterized by the fact that the first discharge device has a second control electrode, by a third time constant network, and by the fact that the responsive means includes means, including said third network for connecting the anode of the second device to said second control electrode.

10. In combination a first conductor, a second conductor, a third conductor, rectifier means, first inductive reactance means, means for connecting said reactance means and said rectifier means between said third conductor and said second conductor respectively, said rectifier being poled to conduct positive current from said third conductor to said second conductor, a first electric discharge device having an anode, a cathode, and a control electrode, second inductive reactance means, means, including said second reactance means for connecting said anode and cathode between said first conductor and said second conductor respectively, a first time constant network, means for connecting said network between the junction of said first reactance means and said rectifier means and said control electrode, a fourth conductor, a second electric discharge device having an anode, a cathode and a control electrode, means for connecting said anode and cathode of said second device between said fourth conductor and said second conductor respectively, a second time-constant network, means for connecting said network between said anode of said first device and said control electrode of said second device, and means responsive to the conduction of said second device for rendering said first device non-conducting.

11. In combination a first conductor, a second conductor, a third conductor, means for impressing alternating potentials in opposite phase between said first conductor and said second conductor and said third conductor and said second conductor, rectifier means, first inductive reactance means, means for connecting said reactance means and said rectifier means between said third conductor and said second conductor respectively, said rectifier being poled to conduct positive current from said third conductor to said second conductor, a first electric discharge device having an anode, a cathode, and a control electrode, second inductive reactance means, means, including said second reactance means for connecting said anode and cathode between said first conductor and said second conductor respectively, a first time-constant network, means for connecting said network between the junction of said first reactance means and said rectifier means and said control electrode, a fourth conductor, means for impressing a potential between said fourth conductor and said second conductor in opposite phase to the potential between said first conductor and said second conductor, a second electric discharge device having an anode, a cathode and a control electrode, means for connecting said anode and cathode of said second device between said fourth conductor and said second conductor respectively, a second time-constant network, means for connecting said network between said anode of said first device and said control electrode of said second device, means responsive to the conduction of said second device for rendering said first device non-conducting, and means for rendering said responsive means ineffective at the will of an operator.

References Cited in the file of this patent

UNITED STATES PATENTS 2,672,543     Faulk _____ Mar. 16, 1954